(12) United States Patent
Eppler et al.

(10) Patent No.: US 9,987,936 B2
(45) Date of Patent: Jun. 5, 2018

(54) COIL APPARATUS AND METHOD FOR INDUCTIVE POWER TRANSMISSION

(71) Applicant: Robert Bosch GmbH, Stuttgart (DE)

(72) Inventors: Steffen Eppler, Ludwigsburg (DE); Bernd Eckert, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 14/896,600

(22) PCT Filed: May 8, 2014

(86) PCT No.: PCT/EP2014/059420
§ 371 (c)(1),
(2) Date: Dec. 7, 2015

(87) PCT Pub. No.: WO2014/195079
PCT Pub. Date: Dec. 11, 2014

(65) Prior Publication Data
US 2016/0107528 A1   Apr. 21, 2016

(30) Foreign Application Priority Data
Jun. 5, 2013  (DE) .................. 10 2013 210 411

(51) Int. Cl.
*H02J 7/00*   (2006.01)
*B60L 11/18*  (2006.01)
(Continued)

(52) U.S. Cl.
CPC ............ *B60L 11/182* (2013.01); *H01F 27/02* (2013.01); *H01F 38/14* (2013.01); *H02J 5/005* (2013.01);
(Continued)

(58) Field of Classification Search
USPC .......................................... 320/108
See application file for complete search history.

(56) References Cited

U.S. PATENT DOCUMENTS 6,326,767 B1 * 12/2001 Small ................. H01M 2/1055
320/116
9,722,450 B2 * 8/2017 Wagman ................ H02J 7/025
(Continued)

FOREIGN PATENT DOCUMENTS

CN    102695629 A    9/2012
CN    102782985 A    11/2012
(Continued)

OTHER PUBLICATIONS

International Search Report for Application No. PCT/EP2014/059420 dated Aug. 26, 2014 (English Translation, 2 pages).

*Primary Examiner* — Samuel Berhanu
(74) *Attorney, Agent, or Firm* — Michael Best & Friedrich LLP

(57) ABSTRACT

The invention provides a coil apparatus (100) for inductive power transmission, comprising an electromagnetic coil (102) for emitting and/or picking up an electromagnetic field (112) on a transmission side (106) of the coil apparatus (100), and comprising a housing wall (104), which covers the coil (102) on the transmission side (106) and is transmissive to the electromagnetic field (112). Furthermore, the coil apparatus (100) comprises a housing medium (108), which is enclosed by the housing wall (104) in such a way that, when a through-opening (110) is formed in the housing wall (104), the housing medium (108) passes through the through-opening (110). Alternatively, a housing vacuum is provided which is enclosed by the housing wall in such a way that, when a through-opening is formed in the housing wall, atmospheric air (118) passes through the through-opening. Among further aspects, a vehicle comprising such
(Continued)

a coil apparatus and a method for inductive power transmission are provided. The method comprises steps of providing an electromagnetic coil (102) for emitting and/or picking up an electromagnetic field (112), covering the coil (102) on a transmission side (106) with a housing wall (104) which is transmissive to the electromagnetic field (112), enclosing a fluid (116) with an internal pressure which is different than the atmospheric air by the housing wall (104), sending the internal pressure, evaluating whether the internal pressure reaches a presettable internal pressure threshold value, and outputting a signal when the internal pressure reaches the internal pressure threshold value.

20 Claims, 5 Drawing Sheets

(51) Int. Cl.
*H01F 27/02* (2006.01)
*H01F 38/14* (2006.01)
*H02J 5/00* (2016.01)

(52) U.S. Cl.
CPC ........ *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | | |
|---|---|---|---|---|
| 2005/0205820 | A1* | 9/2005 | Babich | H01F 3/02 251/129.15 |
| 2008/0265684 | A1* | 10/2008 | Farkas | B60L 11/005 307/104 |
| 2008/0297295 | A1* | 12/2008 | Yamazaki | H01F 5/003 336/90 |
| 2010/0065352 | A1* | 3/2010 | Ichikawa | B60L 11/182 180/65.8 |
| 2012/0104287 | A1* | 5/2012 | Derks | G09F 3/207 250/493.1 |
| 2014/0239728 | A1* | 8/2014 | Yamakawa | B60L 11/182 307/104 |
| 2015/0069967 | A1* | 3/2015 | Baarman | B60L 11/182 320/108 |
| 2015/0303699 | A1* | 10/2015 | Wagman | H02J 50/10 307/104 |

FOREIGN PATENT DOCUMENTS

| | | |
|---|---|---|
| DE | 102010052108 | 5/2012 |
| EP | 2773012 A1 | 9/2014 |
| JP | S5018986 A | 2/1975 |
| JP | S63301143 A | 12/1988 |
| JP | H0613762 A | 1/1994 |
| WO | 2012099170 A1 | 7/2012 |
| WO | 2012132413 | 10/2012 |

* cited by examiner

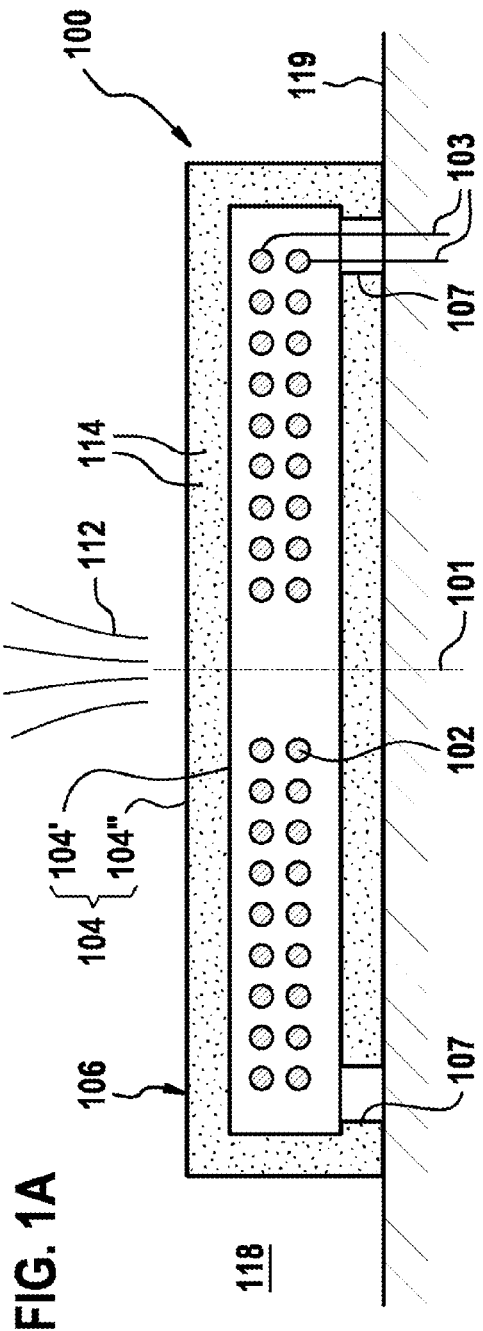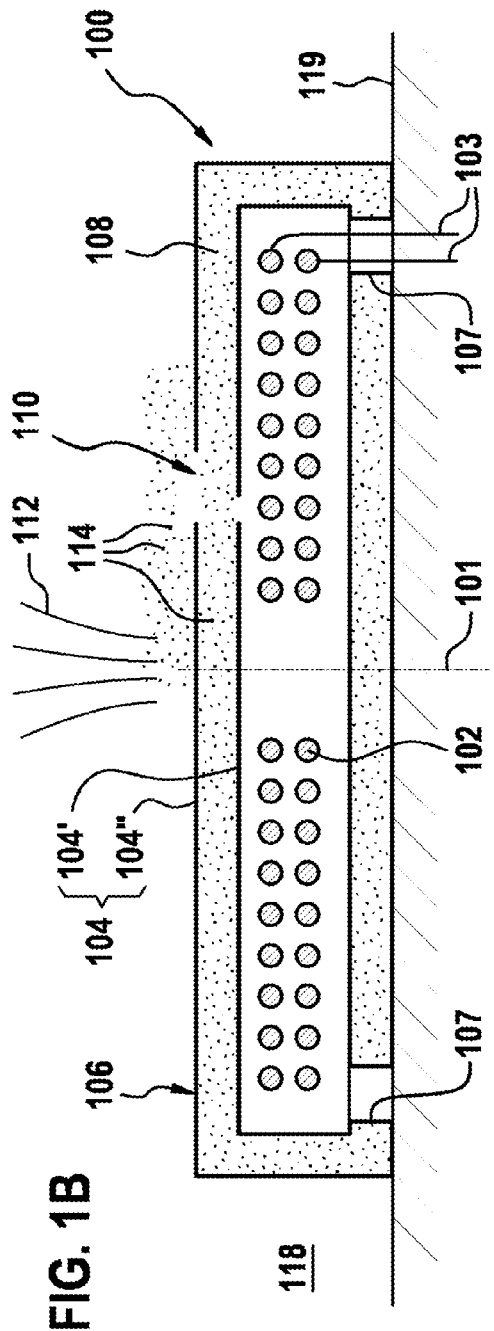

COIL APPARATUS AND METHOD FOR INDUCTIVE POWER TRANSMISSION

BACKGROUND OF THE INVENTION

The present invention relates to a method and a coil apparatus for inductive power transmission. The invention also relates to a vehicle comprising a coil apparatus of this type.

Although applicable to any coil apparatuses for inductive power transmission, the present invention will be presented, without loss of generality, on the basis of the example of coil apparatuses for contactless, inductive charging of batteries of electrically operated vehicles.

Electric vehicles, which nowadays are tested as prototypes or in test fleets, are equipped with coil apparatuses of this type, which comprise one or more electromagnetic coils installed in an insulating plastics housing and which are usually mounted on the vehicle underbody or are embedded therein, such that they constitute the lowest parts on the vehicle underbody. This makes it possible to start the charging process comfortably without delay as soon as the vehicle is stopped at a charging point equipped with a corresponding further coil apparatus arranged on the ground.

When traveling over curbs or poor-quality stretches of road, however, it is routinely expected in the case of road vehicles of conventional design that the underbody will contact or scrape along the curb/road surface. Such contact leads to damage at the lowest parts of the vehicle underbody. In the event of mechanical damage with damage to the insulation of the coil apparatus, an electric shock caused by insufficiently insulated voltage is to be anticipated in the event of contact. The same is true for coil apparatuses arranged on the ground, which apparatuses for example lie on the floor of a garage or on the ground at a parking space or are embedded therein and may be damaged when driven over or when scraped over. It is thus desirable to avoid the risk of electrical accidents with electric shock when using coil apparatuses for inductive power transmission.

SUMMARY OF THE INVENTION

Accordingly, a coil apparatus for inductive power transmission is provided, comprising an electromagnetic coil for emitting and/or picking up an electromagnetic field on a transmission side of the coil apparatus, and comprising a housing wall, which covers the coil on the transmission side and is transmissive to the electromagnetic field. The coil apparatus may also comprise a plurality of coils and may be designed for inductive power transmission also on other sides. The coil apparatus has a housing medium, which is enclosed by the housing wall in such a way that, when a through-opening is formed in the housing wall, the housing medium passes through the through-opening. As the housing medium passes through the through-opening, the housing medium thus leaves the space in which it is enclosed by the housing wall. The housing medium may be a suitable chemical substance or a suitable substance mixture, wherein the type of the housing medium and the conditions of the enclosure are coordinated with one another, such that, when a through-opening is formed, the housing medium is discharged, for example by diffusion, by vibration as the through-opening itself is formed, or by an existing or subsequently produced pressure difference.

In accordance with a further aspect a method for inductive power transmission is provided. The method comprises steps of providing an electromagnetic coil for emitting and/or picking up an electromagnetic field, covering the coil on a transmission side with a housing wall which is transmissive to the electromagnetic field, enclosing a fluid with an internal pressure that is different from the atmospheric air by means of the housing wall, sensing the internal pressure, assessing whether the internal pressure reaches a predefinable internal pressure threshold value, and emitting a signal when the internal pressure reaches the internal pressure threshold value.

The inventive coil apparatus makes it possible to reliably avoid electric accidents with a coil used for inductive power transmission, even in the event of mechanical damage from the transmission side. With normal operation the housing wall, since it covers the coil on the transmission side, firstly prevents any direct contact of live parts of the coil by the user. Even with a relatively small amount of damage, for example caused by mechanical impacts on the coil apparatus which might not break through the housing wall, the user remains protected against electric accidents by the housing wall still providing an intact covering of the coil. Lastly, in the event of damage so significant that the coil may be exposed, a through-opening is also inevitably created in the housing wall between the coil and the object acting mechanically from the transmission side, such that, in accordance with the invention, the housing medium passes through the through-opening. This makes it possible to determine the presence of the damage by suitable monitoring of the housing medium, without having to accurately locate the damage itself, such that, for example by being switched off, the inductive power transmission is immediately terminated and a continued endangerment by exposed live parts can be avoided.

In accordance with a preferred development of the coil apparatus the housing medium has a dye. On the basis of the leaked dye this allows a user of the coil apparatus to notice in a particularly simple manner, merely by visual inspection, any damage to the coil apparatus where the housing wall has been broken through, so as to then be able to take safety measures, such as switching off the coil apparatus, or to carry out a repair. The dye is preferably formed as a colored powder, which is particularly easily noticeable, since it quickly distributes over a large area once it has passed through the through-opening.

In accordance with a preferred development the housing medium has a fluid with an internal pressure that is increased compared with atmospheric air. By way of example, the pressurized fluid can be formed as air, another gas, or a liquid. If the through-opening is formed, the fluid thus passes outwardly through said through-opening, which leads to a particularly reliable drop of the internal pressure in the space enclosed by the housing wall, which drop in internal pressure can be determined for example with the aid of a pressure gauge. The fluid preferably comprises a liquid and/or a gel. This enables a particularly reliable determination even of damage with minimal through-openings, since, on account of the virtual incompressibility of liquids and gels, even minimal amounts of fluid discharging through the through-opening lead to a drastic, easily determinable drop of the internal pressure.

In accordance with a preferred development the coil apparatus also comprises an internal pressure sensor, which senses the internal pressure, and a signal unit, which outputs a signal when the internal pressure falls below a predefinable internal pressure threshold value. This makes it possible to monitor the coil apparatus continuously in an automated manner for the presence of potentially endangering damage, such that a particularly high level of safety is attained alongside comfortable use.

In an alternative aspect, the invention provides a coil apparatus, in which, instead of the housing medium, which is enclosed by the housing wall in such a way that when a through-opening is formed in the housing wall the housing medium passes through the through-opening, a housing vacuum is used, which is enclosed by the housing wall in such a way that, when a through-opening is formed in the housing wall, atmospheric air passes through the through-opening. Here, the signal unit, by contrast, is configured to output the signal when the internal pressure exceeds the predefinable internal pressure threshold value. The term "housing vacuum" is not only understood to mean an ideal vacuum, but in the further sense is also understood to mean a housing medium that comprises a fluid, in particular air or another gas or gas mixture, with an internal pressure that is reduced compared to atmospheric pressure.

In accordance with a preferred development the coil apparatus also comprises an external pressure sensor, which senses an external pressure of the atmosphere. Here, the signal unit comprises a threshold value determination unit, which determines the internal pressure threshold value depending on the external pressure. This makes it possible to avoid false signals as a result of fluctuations of the atmospheric pressure and thus makes it possible to achieve a particularly high level of safety, without the need for an internal pressure deviating excessively from atmospheric pressure and for corresponding structural outlay, such as an excessive thickness of the housing wall.

In accordance with a preferred development the housing wall comprises an inner wall and an outer wall, which cover the coil on the transmission side. This means that the housing wall is designed on the transmission side in a double-walled manner. This on the one hand makes it possible to configure the coil apparatus with a very low volume of the housing medium, which is advantageous in terms of material costs and the overall weight of the coil apparatus, depending on the housing medium used. In addition, since the coil itself is located outside the space filled by the housing medium, maintenance and inspection of the coil are facilitated. In accordance with an alternative development the housing wall surrounds the coil, which allows a saving of wall material, since a double-walled embodiment of the housing wall is unnecessary.

In a further aspect the invention provides a vehicle comprising an electric accumulator, which comprises a coil apparatus of this type for inductive power transmission to the electric accumulator. The coil apparatus is preferably arranged on an underbody of the vehicle, wherein the transmission side points downward. This makes it possible to arrange the coil apparatus particularly low above the ground for efficient power transmission with further coil apparatuses located on or in the ground without the risk of increasing electric accidents. The housing wall more preferably covers the coil downwardly and to the side. The protection against electric accidents thus extends to a threat of mechanical damage of the coil apparatus not only from below, but also from the side.

BRIEF DESCRIPTION OF THE DRAWINGS

FIG. 1A shows a schematic cross-sectional view of a coil apparatus in accordance with an embodiment of the invention;

FIG. 1B shows a schematic cross-sectional view of the coil apparatus from FIG. 1 in a damaged state;

Figure 2:
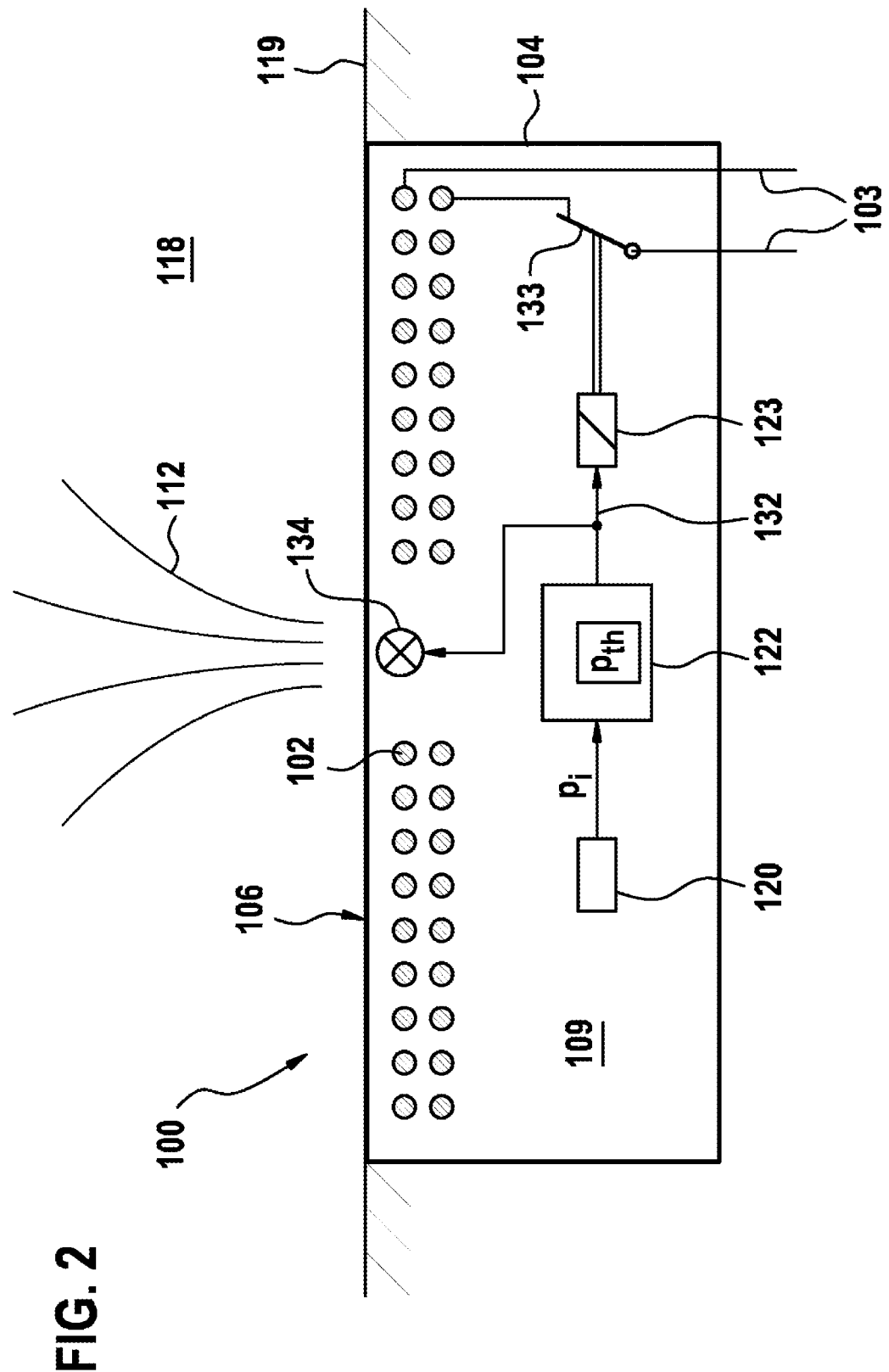
FIGS. 2 and 3 show schematic cross-sectional views of coil apparatuses in accordance with two different embodiments.

Unless expressly mentioned otherwise, like reference signs in the figures refer to like or equivalent elements.

DETAILED DESCRIPTION

FIG. 1A, in a schematic cross-sectional view, shows a coil apparatus 100, arranged on the ground 119, for inductive power transmission by means of an electromagnetic field 112 to a further coil apparatus (not shown), which can be arranged above the upper side of the coil apparatus 100, designated as the transmission side 106, and for example can be mounted on an electric vehicle (not shown), which is to stop above the coil apparatus 100. The coil apparatus 100 comprises a coil 102, of which the windings are wound on the whole in the form of a flat cylinder, of which the axis of symmetry 101 lies in the drawing plane, and also a housing, which surrounds the coil 102 and likewise has a cylindrical wall 104.

The wall 104 of the housing of the coil apparatus 100 is double-walled peripherally with an inner wall 104' and an outer wall 104" made of an electrically non-conductive material, wherein, in order to support the inner wall 104' on the underside of the coil apparatus facing away from the transmission side, spacers 107 are inserted between the inner wall 104' and an outer wall 104". A two-core feed line 103 for feeding electrical power into the coil 102 is guided outwardly through one of the spacers 107. The space located within the inner wall 104', in which space the coil 102 is located, is filled with a suitable medium, for example an oil, a protective gas, or with air, which for example can be connected via the spacers 107 to the external air of the atmosphere 118 or can be sealed off with respect thereto.

The space located between the inner wall 104' and outer wall 104" of the housing is hermetically sealed with respect to the atmosphere 118 and is filled by a housing medium 108, which, besides air at low atmospheric pressure, also contains a dye in the form of a colored powder 114 of any color. The colored powder 114 is selected such that, if released in the event of damage to the outer wall 104", it quickly spreads over a radius of a number of cm or dm and leaves behind easily noticeable traces. In alternative embodiments the housing medium may be enclosed at overpressure between the inner wall 104' and the outer wall 104".

FIG. 1B shows the coil apparatus from FIG. 1 in a damaged state following influence of mechanical force from above, i.e. from the transmission side 106. Due to the force influence, a small through-opening 110 has formed in the housing wall 104 and extends through an opening in the outer wall 104" and a slightly smaller opening in the inner wall 104' as far as the space located within the inner wall 104', such that the coil 102 located therein is exposed in part. Due to the vibration during the force influence, the housing medium 108 located between the outer wall 104" and inner wall 104' has passed through the through-opening 110 into the atmosphere 118 outside the outer wall 104" and has distributed the colored powder 114 contained in the housing medium 108 at the outer side of the outer wall 104" in a radius of a number of centimeters. In the case of embodiments in which the housing medium is at overpressure with respect to the atmosphere 118, the overpressure assists the outward passage of the housing medium 108 and therefore the distribution of the colored powder 114. Due to its arbitrary color, the colored powder 114 is easily noticeable as a colored stain to the user of the coil apparatus 100, which allows the user to protect themself against the threat of an electric accident by switching off the electrical power feed via the feed line 103, and allows the user to repair or replace the coil apparatus 100.

FIG. 2 shows a coil apparatus 100 in accordance with a further embodiment, said coil device being arranged fully recessed in the ground 119, such that the housing wall 104 on the transmission side 106 terminates flush with the surface of the ground 119. In contrast to the embodiment from FIGS. 1A-B, the housing wall 104 is formed as a single wall, which hermetically surrounds an interior, in which the coil 102 is arranged. A housing vacuum 109 prevails in the interior enclosed by the housing wall 104, wherein the term "housing vacuum" is not limited to an ideal vacuum, but generally designates a situation in which the interior is filled with air or another gas or gas mixture having an internal pressure $p_i$ that is reduced compared with the atmosphere 118. In the present embodiment the internal pressure $p_i$ is 100 hPa by way of example. The feed line 103 is guided through the housing wall 104 in a hermetically sealed manner.

The coil apparatus 100 of the present embodiment also comprises, in the interior enclosed by the housing wall 104, an internal pressure sensor 120, which senses the internal pressure $p_i$ and at its output provides a corresponding pressure signal, a signal unit 122, which is connected to the output of the internal pressure sensor 120 and which compares the internal pressure $p_i$ according to the pressure signal received from the pressure sensor with a threshold value $p_{th}$ stored previously in the signal unit, for example of 550 hPa, and provides, at its output, a signal 132 corresponding to the comparison result, an alarm device 134, and a switching device 123, which are both connected to the output of the signal unit 122. The alarm device 134 is formed in the present embodiment by way of example as a warning lamp, which in alternative embodiments can be replaced by or supplemented by other warning devices, such as sound generators, or the like. The switching device 123 is formed by way of example in the present embodiment as a relay with a switch contact 133 arranged in the feed line 103, which switch contact can be replaced in alternative embodiments by a semiconductor switching element, for example.

In the case of fault-free operation of the coil apparatus 100, the switch contact 133 is closed, such that the coil 102 is supplied with electrical power via the feed line 103 and generates an electromagnetic field 112 extending toward the transmission side 106. The internal pressure sensor 120 continuously signals the internal pressure value $p_i$=100 hPa prevailing within the housing wall 104 to the signal unit 122, which determines that the internal pressure, $p_i$ lies below the internal pressure threshold value $p_{th}$=550 hPa and accordingly does not emit a signal at its output. Provided the switching device 123 does not receive a signal from the signal unit 122, it leaves the switch contact 133 closed, such that the coil apparatus 100 continues the generation of the electromagnetic field 112 for inductive power transmission.

In the event of mechanical damage of the coil apparatus 100, in which case a through-opening (not shown) is created in the housing wall 104, air flows from the atmosphere 118, which for example is at a typical pressure of 1000 hPa, into the interior enclosed by the housing wall 104, whereby the internal pressure $p_i$ adjusts to atmospheric pressure. The internal pressure sensor 120 signals the internal pressure $p_i$=1000 hPa to the signal unit 122, which determines that the internal pressure $p_i$ has reached or exceeded the internal pressure threshold value $p_{th}$=550 hPa and emits a corresponding signal 132 to the switching device 123 and the warning device 134. Upon receipt of this signal 132, the switching device 123 switches off the feed of electrical power to the coil 102, whereas the warning device 134 emits a warning light in order to notify the user.

In alternative embodiments the internal pressure $p_i$ may be higher than the atmospheric pressure. By way of example the internal pressure may be $p_i$=2000 hPa and the internal pressure threshold value $p_{th}$ with 1500 hPa as in the present embodiment may be fixed at the mean value between the set internal pressure $p_i$ and the typical atmospheric pressure of 1000 hPa, wherein the signal unit 122 is designed to emit the signal when the internal pressure $p_i$ has reached or fallen below the internal pressure threshold value $p_{th}$.

Figure 3:
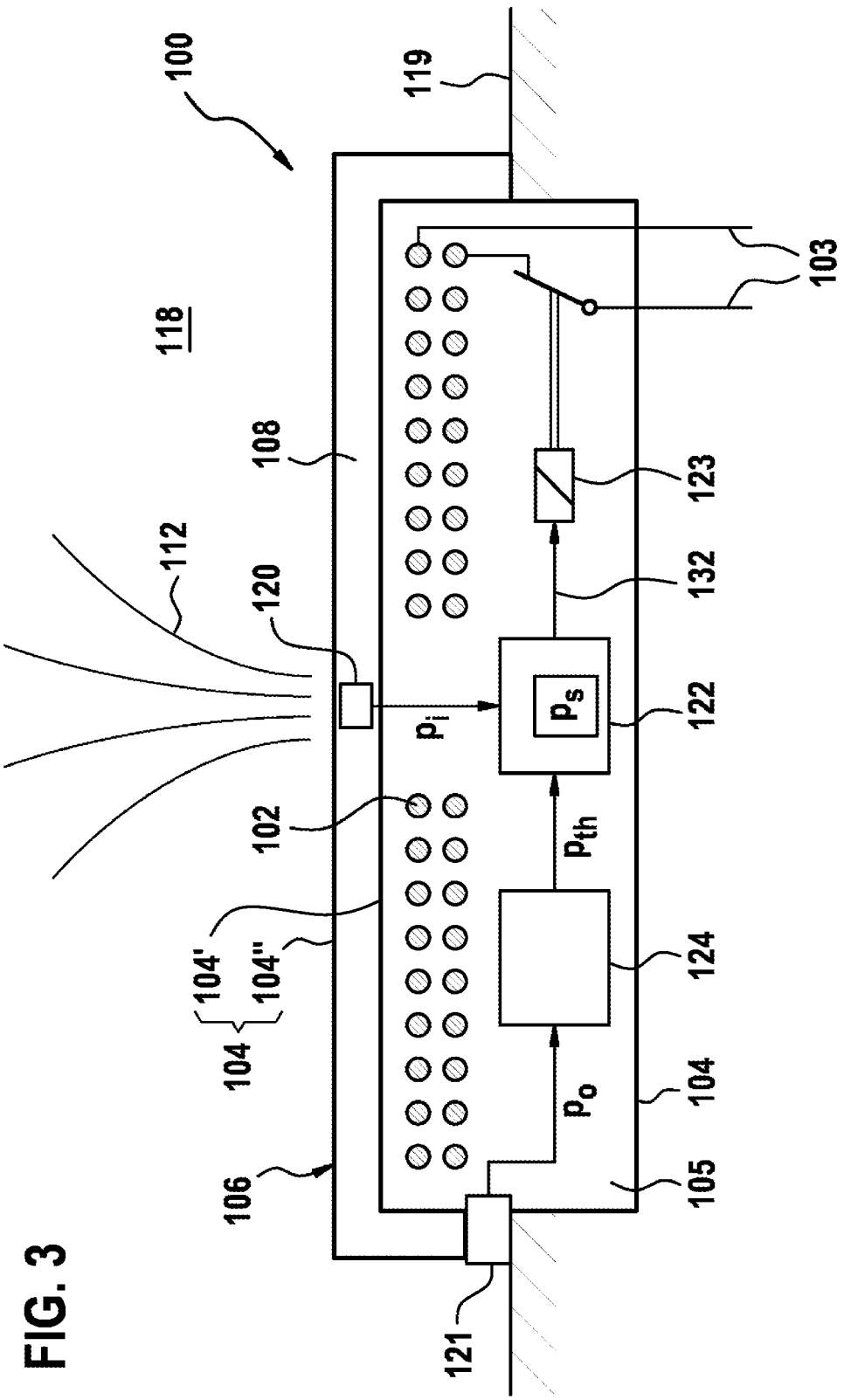

FIG. 3 shows a coil apparatus 100 in accordance with a further embodiment, which is reassessed in the ground 119 up to approximately half the overall height. In the present embodiment the housing wall 104 in the wall portions recessed in the ground 119 is embodied as a single wall, but by contrast is double-walled at the portions of the side walls arranged above the ground 119 and on the transmission side 106. The space located between the inner wall 104' and outer wall 104" is filled with a liquid as housing medium 108, which is at an internal pressure $p_i$ that is increased compared with the typical pressure of the atmosphere 118. By way of example, the internal pressure set when filling the housing medium 108 is $p_i$=3000 hPa. The internal pressure sensor 120 is arranged in the housing medium 108 between the inner wall 104' and outer wall 104", whereas the signal unit 122 connected to the internal pressure sensor 120 is located jointly with the coil 102 in a coil space 105, which is filled with air at atmospheric pressure and which is enclosed by the inner wall 104' and the portions of the housing wall 104 embodied as a single wall.

In contrast to the embodiment of FIG. 2, the coil apparatus 100 of the present embodiment has an external pressure sensor 121 reaching as far as the outer side of the coil apparatus 100 for sensing the external pressure $p_o$ prevailing in the atmosphere 118 and also a threshold value determination unit 124 arranged in the coil space 105 for determining the internal pressure threshold value $p_{th}$ depending on the external pressure $p_o$, for which purpose an output of the external pressure sensor 121 is connected to an input of the threshold value determination unit 124, and an output of the threshold value determination unit 124 is connected to an input of the signal unit 122. In alternative embodiments the coil space 105 can be connected by suitable pressure compensation openings to the atmosphere 118, wherein in this case the external pressure sensor 121 may be arranged in the coil space 105. The housing medium 108 may also alternatively be formed as a gel or a gas or gas mixture, such as air, and may contain a colored powder or another dye for additional safety.

With fault-free operation of the coil apparatus 100, the external pressure sensor 121 continuously determines the air pressure $p_o$ in the atmosphere 118 and signals this to the threshold value determination unit 124. The threshold value determination unit 124 determines the internal pressure threshold value $p_{th}$ depending on the external pressure $p_o$, for example by forming the mean value from the external pressure $p_o$ and a standard internal pressure $p_s$, which is stored previously in the signal unit and corresponds to the internal pressure $p_i$ of the housing medium 108 set in the undamaged state of the coil apparatus 100.

Figure 4:
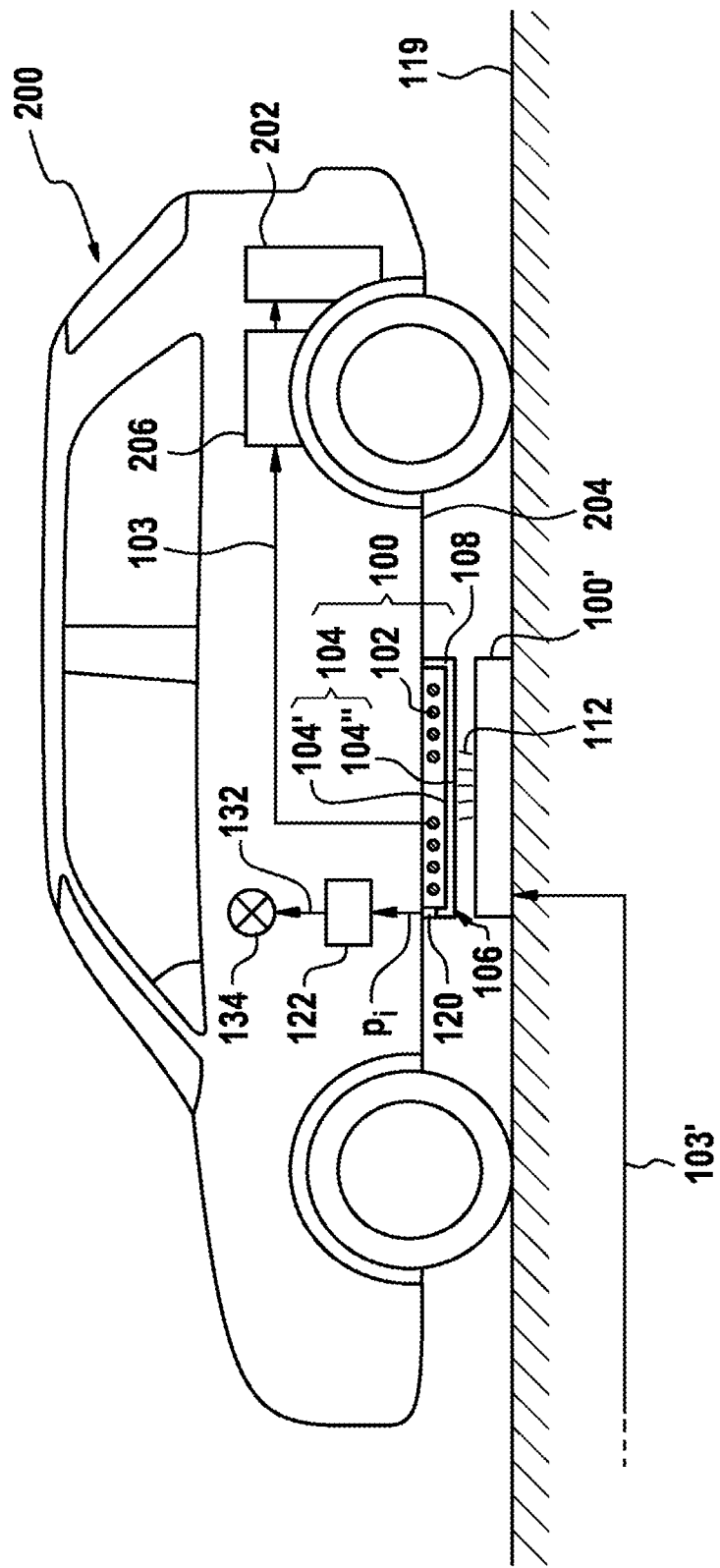
FIG. 4 shows a schematic side view of a vehicle in accordance with an embodiment.

FIG. 4 shows a schematic side view of a vehicle 200, which has an electric motor 202 fed from a rechargeable battery 206 as electric accumulator for driving the vehicle 200. The battery 206 is connected via a feed line 103 for charging the battery 206 to a coil apparatus 100 mounted on the vehicle underbody 204. The coil apparatus 100 contains a coil 102 for inductive power consumption from a transmission side 106, which points downwardly in this case. Similarly to the coil apparatus in FIG. 3, the coil apparatus 100 of the vehicle 200 is located on the transmission side 106 and is covered in a lateral direction by a double-walled housing wall 104, within which a gel 108 is located at overpressure as housing medium.

FIG. 4 shows the vehicle 200 in a situation in which it is stopped above a further coil apparatus 100', which is mounted on the ground 119 and which is connected to the mains grid via a supply feed line 103' running in the ground 119. The further coil apparatus 100' may likewise be formed in accordance with an embodiment of the present invention.

In the charging mode the further coil apparatus 100' generates, with the aid of the grid power fed via the supply feed line 103', an electromagnetic alternating field 112, which also penetrates the coil 102 of the coil apparatus 100 mounted on the vehicle underbody 204. An electrical voltage is hereby induced in the coil 102 and produces a charging current flowing through the coil 102 and the feed line 103 for charging the battery 206. A signal unit 122 of the coil apparatus 100 monitors the internal pressure $p_i$ by comparing this with a predefined threshold value, and, in the event that the threshold value is undershot, emits a signal 132, which lights up a warning lamp 134 on the instrument panel of the vehicle 200.

Figure 5:
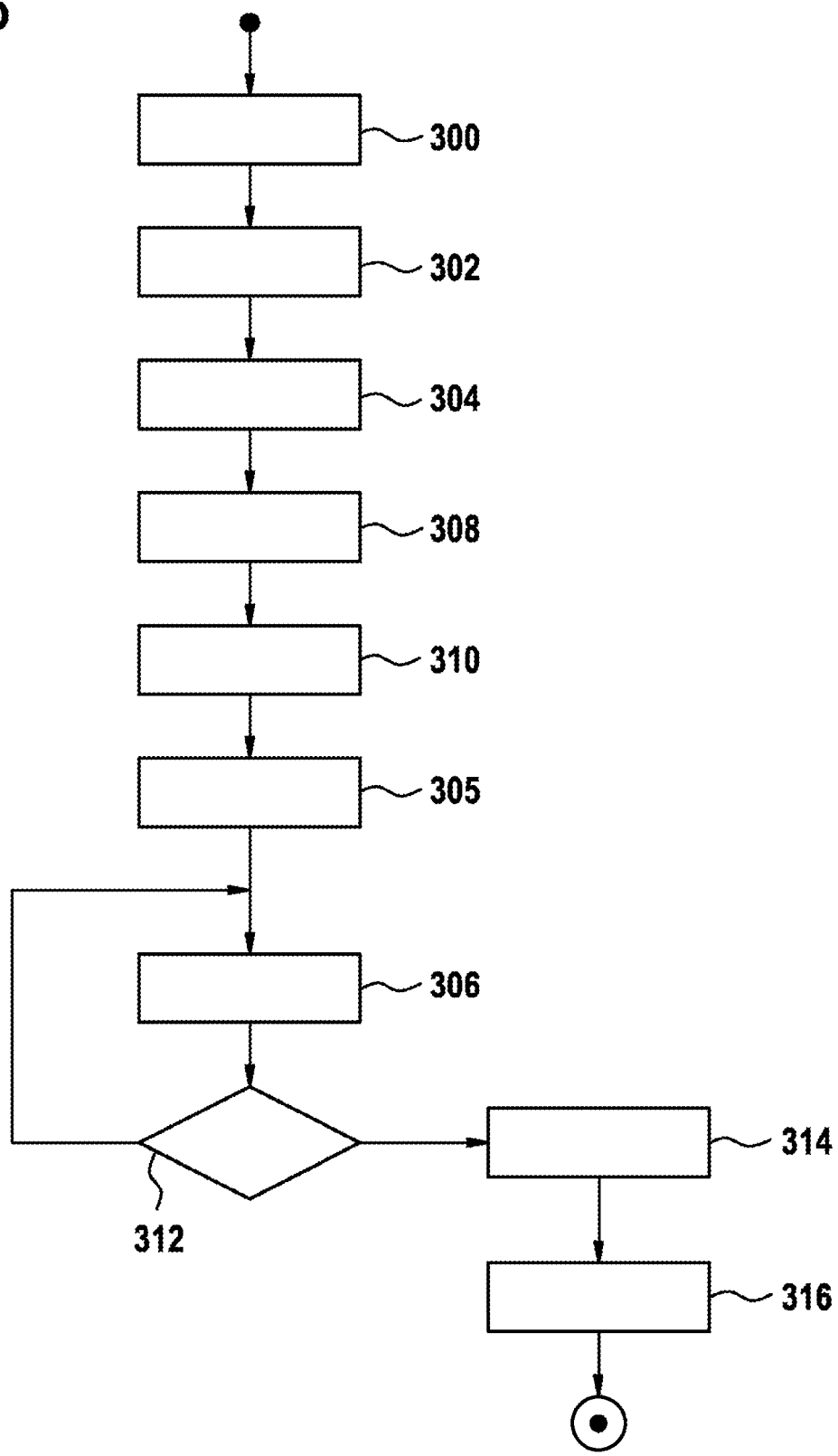
FIG. 5 shows a flow diagram of a method for inductive power transmission in accordance with an embodiment.

FIG. 5 shows a flow diagram of a method for inductive power transmission. At the start of the method a coil for the inductive power transmission is provided in cooperation with a further coil in step 300. In step 302 the coil is covered by a housing wall on a transmission side, on which the further coil is to be arranged during the inductive power transmission.

In step 304 a fluid at a predefined internal pressure is arranged as a housing medium in a space enclosed by the housing wall, which space may enclose the coil or may be formed separately within the housing wall. The predefined internal pressure lies above a range in which fluctuations of the atmospheric pressure are to be expected for the intended use. In step 308 the external pressure currently prevailing in the surrounding atmosphere is detected by means of an external pressure sensor. In step 310 an internal pressure threshold value between the predefined internal pressure and the detected external pressure is determined, for example by forming the mean value from the predefined internal pressure and the external pressure detected in step 308.

In step 305 an inductive power transmission is started, in that a further coil is arranged on the transmission side covered by the housing wall in step 302 and an electromagnetic alternating field is generated with one of the coils and penetrates the other coil in order to induce an electrical voltage therein. In step 306 the internal pressure currently prevailing in the housing medium is detected by means of an internal pressure sensor arranged in the housing medium. In the branch step 312 it is assessed whether the internal pressure detected in step 306 lies above the internal pressure threshold value determined in step 310. If this is the case the method reverts to step 306. If, however, it is determined in the branch step 312 that the internal pressure has fallen since the enclosure of the housing medium in step 304 to such an extent that it reaches or has already undershot the internal pressure threshold value, for example on account of damage to the housing wall, the method jumps to step 314, in which the coil is switched off in order to interrupt the inductive power transmission. In step 316 an acoustic or optical warning signal for example is emitted in order to notify the user of the incident.

In a modified embodiment of the method the housing medium is enclosed in step 304 with a predefined internal pressure below the range in which fluctuations of the atmospheric pressure are to be expected for the intended use. In the case of such a modified embodiment the method in the branch step 312 jumps back to step 306 when the internal pressure detected in step 306 is below the internal pressure threshold value determined in step 310, and jumps to step 314 when the detected internal pressure has risen to such an extent that it has reached or already exceeded the internal pressure threshold value.

The invention claimed is:

1. A coil apparatus (100) for inductive power transmission, comprising:
   an electromagnetic coil (102) for emitting and/or picking up an electromagnetic field (112) on a transmission side (106) of the coil apparatus (100);
   a housing wall (104), which covers the coil (102) on the transmission side (106) and is transmissive to the electromagnetic field (112); and
   a housing medium (108) comprising any one or more of: a liquid, a gel, and a colored powder (114), wherein the housing medium (108) is enclosed by the housing wall (104) and operable to distribute itself to an exterior of the housing wall (104) when a through-opening (110) is formed in the housing wall (104).

2. The coil apparatus (100) as claimed in claim 1, wherein the housing medium (108) comprises a dye.

3. The coil apparatus (100) as claimed in claim 1, wherein the housing medium (108) comprises a fluid (116) with an internal pressure ($p_i$) that is increased compared with the atmospheric air (118).

4. The coil apparatus (100) as claimed in claim 3, wherein the fluid (116) comprises a liquid and/or a gel.

5. The coil apparatus (100) as claimed in claim 3, further comprising:
   an internal pressure sensor (120), which senses the internal pressure ($p_i$); and
   a signal unit (122), which emits a signal (132, 133) when the internal pressure ($p_i$) falls below a predefinable internal pressure threshold value ($p_{th}$).

6. A coil apparatus (100) for inductive power transmission, comprising:
   an electromagnetic coil (102) for emitting and/or picking up an electromagnetic field (112) on a transmission side (106) of the coil apparatus (100);
   a housing wall (104), which covers the coil (102) on the transmission side (106) and is transmissive to the electromagnetic field (112);
   a housing vacuum (109), which is enclosed by the housing wall (104) in such a way that, when a through-opening (110) is formed in the housing wall (104) atmospheric air (118) passes through the through-opening (110);
   an internal pressure sensor (120), which senses an internal pressure ($p_i$) of the housing vacuum (109); and
   a signal unit (122), which emits a signal (132, 133) when the internal pressure ($p_1$) exceeds a predefinable internal pressure threshold value ($p_{th}$).

7. The coil apparatus (100) as claimed in claim 6, further comprising an external pressure sensor (121), which senses an external pressure ($p_o$) of the atmosphere (118), wherein the signal unit (122) comprises a threshold value determination unit (124), which determines the internal pressure threshold value ($p_{th}$) depending on the external pressure ($p_o$).

8. The coil apparatus (100) as claimed in claim 1, wherein the housing wall (104) comprises an inner wall (104') and an outer wall (104"), which cover the coil (102) on the transmission side (106).

9. The coil apparatus (100) as claimed in claim 1, wherein the housing wall (104) encloses the coil (102).

10. A vehicle (200) comprising an electric accumulator (206) and the coil apparatus (100) as claimed in claim 1 for inductive power transmission to the electric accumulator (206).

11. The vehicle (200) as claimed in claim 10, wherein the coil device is arranged on an underbody (204) of the vehicle (200) and the transmission side (106) points downward.

12. The vehicle (200) as claimed in claim 11, wherein the housing wall (104) covers the coil (102) downwardly and to the side.

13. A method for inductive power transmission, comprising the following steps:
- providing (300) an electromagnetic coil (102) for emitting and/or picking up an electromagnetic field (112);
- covering (302) the coil (102) on a transmission side (106) with a housing wall (104) which is transmissive to the electromagnetic field (112);
- enclosing (304) with the housing wall a fluid (116) with an internal pressure ($p_i$) that is different from the atmospheric air (118);
- sensing (306) the internal pressure ($p_I$);
- assessing (312) whether the internal pressure ($p_i$) reaches a predefinable internal pressure threshold value ($p_{th}$); and
- emitting (316) a signal (132, 133) when the internal pressure (pi) reaches the internal pressure threshold value ($p_{th}$).

14. The method as claimed in claim 13, further comprising the following steps:
- sensing (308) an external pressure ($p_o$) of the atmosphere (118); and
- determining (310) the internal pressure threshold value ($p_{th}$) depending on the external pressure ($p_o$).

15. The method as claimed in claim 13, further comprising a step of switching off (314) the coil (102) when the internal pressure ($p_i$) reaches the internal pressure threshold value ($p_{th}$).

16. The coil apparatus (100) as claimed in claim 1, wherein the housing medium (108) comprises a colored powder (114).

17. A vehicle (200) comprising an electric accumulator (206) and a coil device (100) as claimed in claim 16 for inductive power transmission to the electric accumulator (206).

18. The vehicle (200) as claimed in claim 17, wherein the coil device is arranged on an underbody (204) of the vehicle (200) and the transmission side (106) points downward.

19. The vehicle (200) as claimed in claim 18, wherein the housing wall (104) covers the coil (102) downwardly and to the side.

20. The coil apparatus (100) as claimed in claim 5, further comprising an external pressure sensor (121), which senses an external pressure ($p_o$) of the atmosphere (118), wherein the signal unit (122) comprises a threshold value determination unit (124), which determines the internal pressure threshold value ($p_{th}$) depending on the external pressure ($p_o$).

* * * * *